May 10, 1966  D. A. SERGENT  3,250,521
APPARATUS FOR DECOATING UTILIZING A HEATED FLUIDIZED BED
Filed Nov. 6, 1964  3 Sheets-Sheet 1

Inventor:
David A Sergent,
by Paul A. Frank
His Attorney.

May 10, 1966 D. A. SERGENT 3,250,521
APPARATUS FOR DECOATING UTILIZING A HEATED FLUIDIZED BED
Filed Nov. 6, 1964 3 Sheets-Sheet 2

Inventor
David A Sergent
by Paul A. Frank
His Attorney

May 10, 1966 D. A. SERGENT 3,250,521
APPARATUS FOR DECOATING UTILIZING A HEATED FLUIDIZED BED
Filed Nov. 6, 1964 3 Sheets-Sheet 3

Inventor
David A Sergent
by Paul A. Frank
His Attorney

United States Patent Office 3,250,521
Patented May 10, 1966

3,250,521
APPARATUS FOR DECOATING UTILIZING A
HEATED FLUIDIZED BED
David A. Sergent, Schenectady, N.Y., assignor to General
Electric Company, a corporation of New York
Filed Nov. 6, 1964, Ser. No. 409,489
4 Claims. (Cl. 263—21)

This application is a continuation-in-part of application Number 200,259 filed June 5, 1962, by the same inventor and assigned to the same assignee as the present invention.

This invention relates generally to a method and apparatus for heat treating a durable body coated with a solid organic material. More particularly, the invention relates to a method and apparatus for removing the organic material from a durable body having an external layer of the organic material thereon such as finished electrical parts including apparatus having wound insulated electrical conductors, encapsulated dynamo-electric parts, and the like, by direct heat treatment of the object. Specifically, the invention relates to heat treatment of the solid object in a fluidized bed at elevated temperatures until substantially all of the organic material has been removed.

The heat treatment of metal objects in a fluidized bed is shown, for example, in British Patent No. 732,101, which discloses a method and apparatus for modifying the structure and constitution of the metal wherein the body is immersed in a fluidized powdered or granular material at a different temperature from that of the body for a sufficient period of time to transmit heat from the fluidized material to the treated body. A fluidizing medium which is inert to the body being treated at the operating temperatures, such as alumina, may be used to anneal aluminum, silicon alloys, and other metals. The heating of the treated body is accomplished by conduction from contact with the heated fluidized medium which, in turn, can be heated by employing heaters in the fluidizing medium of said chamber or by heating the walls of the fluidizing chamber. The fluidizing gas for suspending the bed of granular material in the fluidizing chamber may itself be heated prior to introduction into the fluidizing chamber for the purpose of securing more uniform temperature distribution throughout the depth of the fluidization bed.

Finished electrical parts are now heat treated in gas atmosphere furnaces to remove the organic insulation in windings, encapsulation, slot liners, etc. Many difficulties are experienced in this process, including warping of the finished part, incomplete removal of the organic material, loss of magnetic and anneal properties in the metal body, introduction of mechanical strain into the part, and change in dimensional tolerances of finished surfaces. Much of the undesirable effects produced in the conventional process can be attributed to uncontrolled combustion of the organic material which occurs in an erratic and sporadic fashion, further increasing the temperature of the metal part being heat treated above the ambient furnace temperature. This phenomena, commonly termed "run away" in the art, further accentuates the inherently uneven heat transfer occurring principally by radiation in a gas atmosphere furnace to such a degree that many parts require refinishing or are beyond repair after heat treatment. In addition to providing inadequate control of the combustion process during removal of the organic material from a solid body, the conventional method requires overly long heating periods which represents a waste of the heat transfer medium and resulting higher cost for the process.

It has been discovered by the applicant that organic material can be removed from a solid body by direct heat treatment in a fluidized bed without the disadvantages encountered in the conventional process. As a consequence, finished metal parts may be heat treated without substantial change in dimensional tolerances of a finished surface and without loss of the anneal or magnetic properties. Ferrous alloys coated with organic material will actually obtain a "blue anneal" after treatment according to the invention due to interaction between the organic material and the metal surface under the particular operating conditions of heating. Controlled combustion of the organic material occurs during heating due to the presence of an inadequate supply of oxygen surrounding the body being treated from displacement by the fluidized particles. This condition prevents rapid oxidation, both of the organic material and the body being treated and greater control of the process is obtained than possible in the conventional method. More particularly, ordinary combustion of organic material is an exothermic reaction which becomes self-generating after inception so long as there remains an adequate supply of both the organic material and oxygen. In the present process, the amount of oxygen in contact with the object being heat treated can be controlled by the degree of fluidization to impart the novel advantages described.

The invention may be practiced in its preferred embodiments as hereinafter described, taken in connection with the accompanying drawings in which, FIGURE 1 illustrates a cross sectional elevation view of one apparatus for heat treating a solid body according to the present invention;

Briefly, the method for treating a solid body coated with a solid organic material according to the invention comprises placing the coated body in a heated fluidized bed, heating the coated body at elevated temperatures above the decomposition temperature of the organic material for a sufficient time period to volatilize said organic material, and removing the treated body from the fluidized bed. If the solid object is heat treated in a normal oxygen containing atmosphere, such as air, the decomposition temperature of the particular organic material will ordinarily be the temperature of combustion with removal being effected by formation of gaseous reaction products. On the other hand, it is known that some common organic insulating materials such as polymethylmethacrylate and polymonochlorotrifluoroethylene can be heated up to the decomposition temperature in a neutral atmosphere such as nitrogen and vacuum to form volatiles without leaving carbonaceous residues.

One novel apparatus for heat treating a solid body according to the invention comprises a fluidizing chamber defined by wall means including piping for admission of a fluidizing gas, a bed of granular material disposed in said chamber capable of suspension in a moving gas stream, heating means in heat transfer relationship with the granular material in said chamber, and passage means for transmitting a stream of the fluidizing gas through a series of baffles which act as insulation means before introduction into the fluidizing chamber. In one preferred embodiment, the heating means may comprise conventional tubular electrical heaters, such as, for, example, those known as "Calrod" heaters, which are positioned vertically within the fluidizing chamber in contact with the granular material, there also being means for distributing the fluidizing gas within the fluidizing chamber. In another embodiment, the heating means comprises longitudinally extending passages containing a heat exchange fluid in contact with the external surface of the vertical walls in the fluidizing chamber, there being means for passing the stream of fluidizing gas in heat transfer relationship with said heating means before introduction into the fluidizing chamber.

Figure 1:
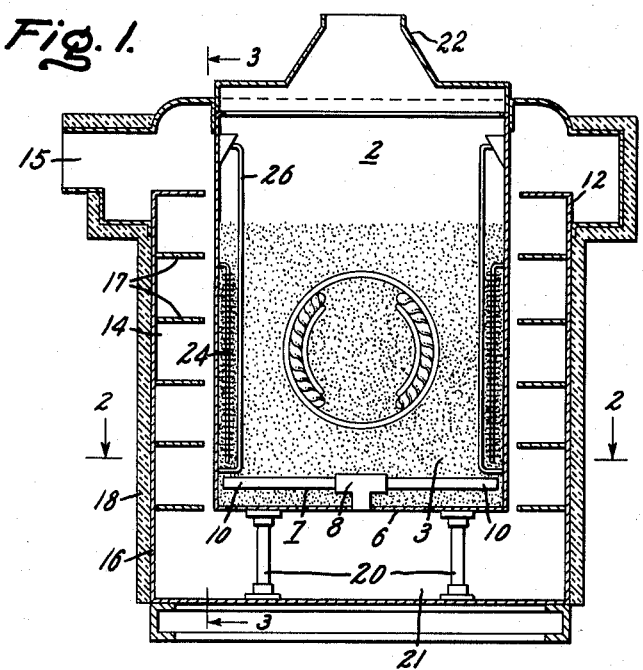

FIGURE 1 illustrates a cross sectional elevation of the heat treating apparatus of my invention. The construction includes fluidizing chamber 2, defined by vertical wall means 4 on four sides thereof and wall means 6 enclosing the bottom in which granular material comprising the fluidizing bed is maintained. Projecting into chamber 2 through bottom 6 is the fluidizing gas inlet means 7 which consists of T shaped connecter 8 and pipes 10 extending horizontally therefrom. Pipes 10 are perforated at the bottom thereof for distribution of the fluidizing gas throughout fluidizing chamber 2. Surrounding chamber 2 is outer enclosure 12 which defines passageway 14 between walls 4 of chamber 2 and walls 16 of surrounding enclosure 12. A thin blanket layer of insulation or lagging 18 is provided around outer enclosure chamber 12 for heat retention purposes. Fluidizing chamber 2 is supported within outer chamber 12 by suitable support means 20 to withstand the load of the fluidized bed within fluidizing chamber 2. Covering fluidizing chamber 2 is exhaust stack 22 which funnels out waste products and thereby avoids contamination of the surrounding air. Within stack 22 may be positioned suitable means for completing combustion of the waste products, as will subsequently be described. This stack 22 can also be removed for access to the interior of fluidizing chamber 2 and fluidizing bed 3.

Figure 2:
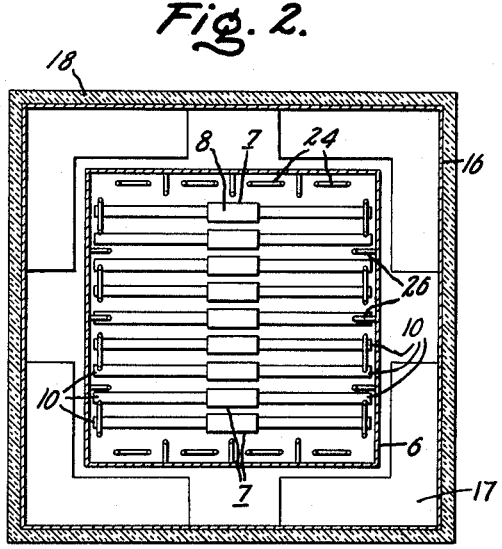
FIGURE 2 is a cross sectional view of the apparatus of FIGURE 1 taken along line 2—2.

Positioned on the interior of fluidizing chamber 2 proximate side walls 4 are thin U shaped electrical heating units or "Calrod" heaters 24, which comprise thin electrical heaters within tubular members to protect them. These heaters have the advantage of providing uniform heating within the bed while not subjecting the apparatus to the dangers inherent in fluid heating, where rupture of a heating pipe could result in serious consequences because of the release of hot gas or fluid within the bed itself. Damage to these "Calrod" heaters would result in bending or in a serious case, severing of the unit which would only stop its operation without the effects that would result from the rupture of a fluid heating line. Rods 26 are placed in a protective position with respect to the heaters to insure prevention of damage to them. As illustrated in FIGURE 2 these heaters are positioned around the inside periphery of the fluidizing chamber to insure even heating of the fluidizing bed.

Figure 3:
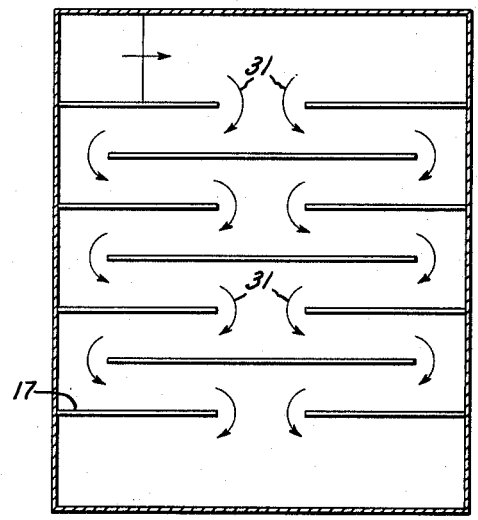
FIGURE 3 is a cross sectional view of the apparatus of FIGURE 1 taken along line 3—3.

Positioned within passageway 14 are baffles 17 as depicted in FIGURE 3. These baffles 17 are positioned so as to project from walls 16 into passageway 14 but not to touch walls 4 of fluidizing chamber 2. By avoiding contact with walls 4 the heat inside chamber 2 is not dissipated by conduction through the baffles. As illustrated in FIGURE 3, baffles 17 are positioned in a staggered fashion to provide no straight path of flow and thereby necessitate the flow to travel slowly through the maze of baffles and provide an insulating effect to prevent the escape of heat from the fluidizing chamber. This employment of the fluidizing gas itself as the insulating medium obviates the necessity of cumbersome and costly insulation, such as firebrick. The only insulation required with this baffle method of insulation is the fluidizing gas itself plus a relatively thin layer of blanket type or board type insulation on the exterior of outer chamber 12.

In operation, the fluidizing granular bed 3 is heated to temperatures of about 800–1000° F., which is adequate for removing insulating material from electrical conductors, by tubular U shaped heaters 24 which are positioned around the inside periphery of fluidizing chamber 2 to provide uniform equilibrium heating throughout bed 3.

Fluidizing gas enters the apparatus through entrance port 15 and travels into passageways 14 on all four sides of fluidizing chamber 2. As the fluidizing gas travels through passageway 14 it encounters staggered baffles 17, which are so placed as aforementioned, to provide the greatest possible path of travel and thereby permit the gas to completely fill the passageways 14. By being entrapped within the passageway, the gas provides an insulating effect on fluidized bed 3 preventing excessive dissipation of heat from the bed. The heat that does escape by radiation or convection from the retort wall is to a large extent absorbed by the fluidizing gas in passageway 14 as it is passing therethrough. The fluidizing gas then passes through plenum 21 and into inlet means 7 to be sprayed through openings in the bottom of pipes 10 and evenly diffused into the fluidizing bed. These inlet means 7 as illustrated in FIGURE 2 are placed throughout the bottom of fluidizing chamber 2 to provide uniform fluidization of the bed.

It is noted that by the travel of fluidizing gas around baffles 17 in passageway 14 as indicated by arrows 31 in FIGURE 3, the gas is forced to take a longer time in passing through the passageway and thereby provide the desired insulation and heat retention effect. By the employment of these baffles, the need for heavy firebrick and other insulators and the high costs inherent therein are avoided.

Figure 4:
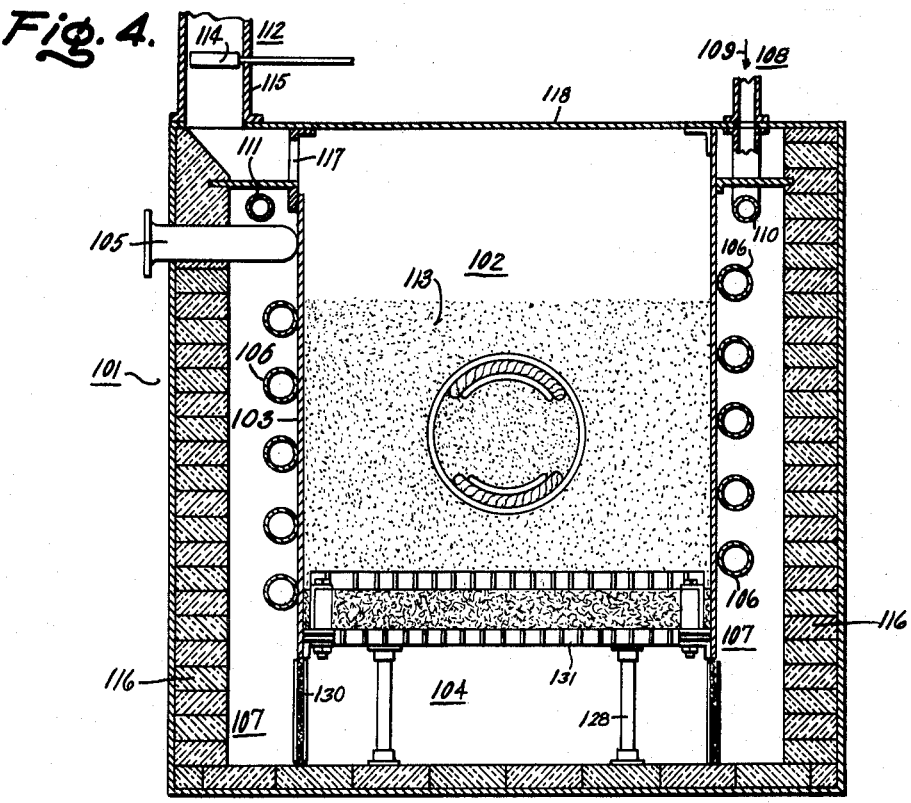
FIGURE 4 is a cross-sectional view of another heat treating apparatus according to the present invention.

In FIGURE 4 there is shown a cross section of a vertical heat treating apparatus 101 of the invention which comprises generally a fluidizing chamber 102, having wall means 103 and 104 defining the chamber with wall member 104 being of porous character for admission of fluidizing gas, heating means 105 comprising a longitudinally extending hollow coil 106 axially disposed on the exterior of fluidizing chamber vertical walls 103, annular passage means 107 for transmitting fluidizing gas in heat transfer relationship with the heating means before introduction into the fluidizing chamber and circulating means 108 which may consist of a simple blower 109 (not shown) connecting conduits 110 and 111 for passing a stream of fluidizing gas through the annular passageway 107 and into the fluidizing chamber. As part of the apparatus, there is also included secondary heating means 112 disposed externally of the fluidizing chamber for further heating the fluidizing gas after passage through bed of granular material 113 contained in said chamber. A convenient arrangement for the secondary heating means comprises a ring burner 114 located in the exhaust flue 115 of the apparatus. Principal heating means 105 is disposed in the apparatus to heat the bed of granular material in the fluidizing chamber by conduction through the vertical walls of the chamber as well as to heat the fluidizing gas before introduction into the fluidizing chamber. Conventional heat exchange fluids may be employed in the practice of the invention which can transmit heat effectively at temperatures above the decomposition temperature of organic material, including gases, liquids, and even fluidized solids.

The apparatus in FIGURE 4 is particularly adapted to remove synthetic organic insulation such as phenolaldehyde resin and epoxy resin from insulated electrical equipment, for example, motors, transformers, and the like, at elevated operating temperatures up to 1000° F. and higher so that the apparatus may be provided with refractory housing 116 for maximum heating efficiency in the fluidizing chamber. The fluidizing chamber itself may consist of a metal shell or ceramic retort which is provided with an exit passage 117 for the volatile products formed during operation. As aforementioned, in both this mode and the mode of FIGURES 1 and 6, the ordinary decomposition products discharged from the fluidizing chamber during operation in an oxygen-containing atmosphere are volatile carbon-containing compounds of the organic material and reaction products of the original material with a limited supply of oxygen. The products generally issue as a dense smoke which are made to undergo further combustion at the secondary heating means 112 to substantially colorless, odorless gases that may now be discharged into the ambient surroundings without contributing to atmospheric pollution. A removable cover 18 provides means for loading and unloading the objects to be heat treated directly into the fluidizing chamber.

In operation, the apparatus of FIGURE 4 may first be heated to operating temperatures in the bed of granular material around 800–1000° F., which is adequate for removal of the conventional phenol-aldehyde and epoxy resin materials used to insulate electrical conductors, transformers, windings, etc. The granular bed is heated by conduction through the walls of the fluidizing chamber from a suitable heat exchange fluid being passed through the coil surrounding the vertical walls of said chamber. A fluidization gas is passed in contact with the heating coil and thereafter introduced into the fluidizing chamber for suspension of the granular material contained therein at flow rates, preferably, which will establish equilibrium temperature conditions throughout all portions of the fluidized bed.

With the fluidization apparatus of my invention, equilibrium conditions of fluidization may be achieved with air flow rates approximately 200–400 standard cubic feet a minute in a fluidized bed having internal dimensions of 26 in. x 26 in. x 26 in. with the fluidizing air being heated to approximately 700° F. before admission into mass of 60–70 mesh U.S. screen size mined silica sand maintained at approximately 900° F. A typical body to be heat treated in accordance with the invention consists of a random wound electrical motor stator of approximately 5 H.P. capacity, being of the four-pole, open drip-proof type with molded epoxy resin potted windings, is completely immersed in the fluidized bed at the operating temperatures for a period of approximately 15–21 minutes and the ring burner ignited. After approximately 15 minutes of heating at the described conditions, all smoke has stopped emanating from the granular bed and the treated part is removed from the fluidized bed at the end of the heating cycle and transferred to a second fluidized bed operating with air at ambient temperatures for a cooling cycle of approximately 30 minutes. The transfer period between fluidized beds is kept to a minimum of around 45 seconds in order to minimize warping of the treated part in the ambient atmosphere. Placing the heated member immediately in a second fluidized chamber maintained at lower operating temperatures than the heat treating fluidized bed cools all portions of said member rapidly at a uniform rate. All surfaces of the cooling member are contacted with granular material at a relatively uniform temperature due to the rapid heat transfer achieved in a fluidized bed so that uneven thermal gradients in localized portions of the member are avoided or greatly reduced. Examination of the treated member after removal from the quenching bed reveals no carbon deposits remaining in the lamination slots of the stator or oxidation of the ferrous metal surfaces. Micrometer measurements made on finished diameter surfaces of the treated member before and after heating are listed to illustrate the lack of dimensional change produced during the present process.

| Place of Measurement | Before Heating (in.) | After Heating (in.) |
|---|---|---|
| Rabbet fit horizontal, connection end | 11.771 | 11.770 |
| Rabbet fit vertical, connection end | 11.771 | 11.770 |
| Opposite end horizontal | 11.771 | 11.772 |
| Opposite end vertical | 11.771 | 11.772 |
| Bore horizontal, center | 7.550 | 7.550 |
| Bore vertical, center | 7.496 | 7.496 |

The almost complete freedom from dimensional change above demonstrated for the present process is surprising and not believed obtainable by other conventional heat treating processes.

Like results were obtained with a commercial hermetic motor stator rated at 15 H.P. and of the four-pole, 10.125 O.D. type, having the end windings insulated with cured phenolaldehyde varnish. The stator was completely immersed in a fluidized bed of the silica at an operating temperature of 900° F. for a period of approximately ten minutes. All smoke from the organic material stopped after approximately three and one-half minutes of the heating cycle. Visual observation of the treated member after a quench cycle as hereinbefore described did not locate any residual carbon deposits or oxidation of the ferrous metal surfaces. The characteristic blue anneal was produced by the heat treatment.

Figure 5:
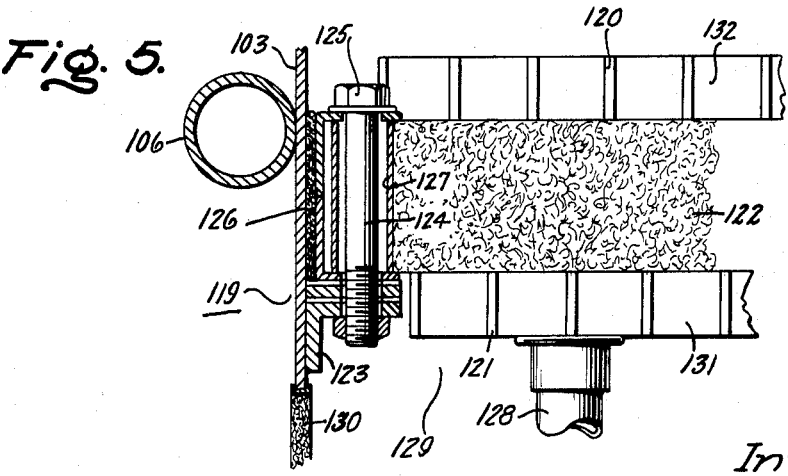
FIGURE 5 is a cross sectional view illustrating in greater detail a particular member of the apparatus in FIGURE 4.

In FIGURE 5 there is shown a porous bottom wall member 119, for admitting fluidizing gas into the fluidizing chamber of the vertical furnace apparatus shown in FIGURE 4. The diffusion wall member comprises generally, two structural grid members 120 and 121 extending substantially across the entire horizontal cross section of the fluidizing chamber and which are spaced apart by one or more layers of commercial porous firebrick 122. The assembly of the grid elements and porous firebrick are bolted in face-to-face relationship to flange member 123, extending inwardly from the vertical walls 103 of the fluidizing chamber by means of fastening studs 124 and nuts 125 in the manner shown. An asbestos gasket 126 or other suitable refractory sealing means is employed at the flange to prevent admission of the fluidizing gas into the chamber except through the porous firebrick diffusion plate. Spacer elements 127 are employed to take the mechanical load of the fluidizing chamber including the weight of granular material and parts being heat treated which are transmitted through structural grid member 120 to prevent fracture of the structurally weak brick. Further mechanical support of the diffusion plate assembly may be provided with vertical supports 128, extending from the base of the apparatus to the underside of lower grid member 121. A plenum chamber 129 is defined below the diffusion plate by the side walls of the fluidizing chamber and the base of the heat treating apparatus. In operation, fluidizing gas is introduced into the plenum chamber after passage in heat transfer relationship with the heating means along the sidewalls of the fluidizing chamber. The heated fluidizing gas is admitted to the plenum chamber through openings 130 therein, and passes upwardly through grid openings 131 in lower supporting grid member 121 from where it is diffused uniformly through the firebrick layer 122, and finally passes into the fluidizing chamber through openings 132 in upper supporting grid member 120. While preference has been indicated for construction of the diffusing interlayer between the grid members from the refractory brick, it will be realized that alternate construction materials may be employed including refractory metal fibers, glass fibers, and the like.

Figure 6:
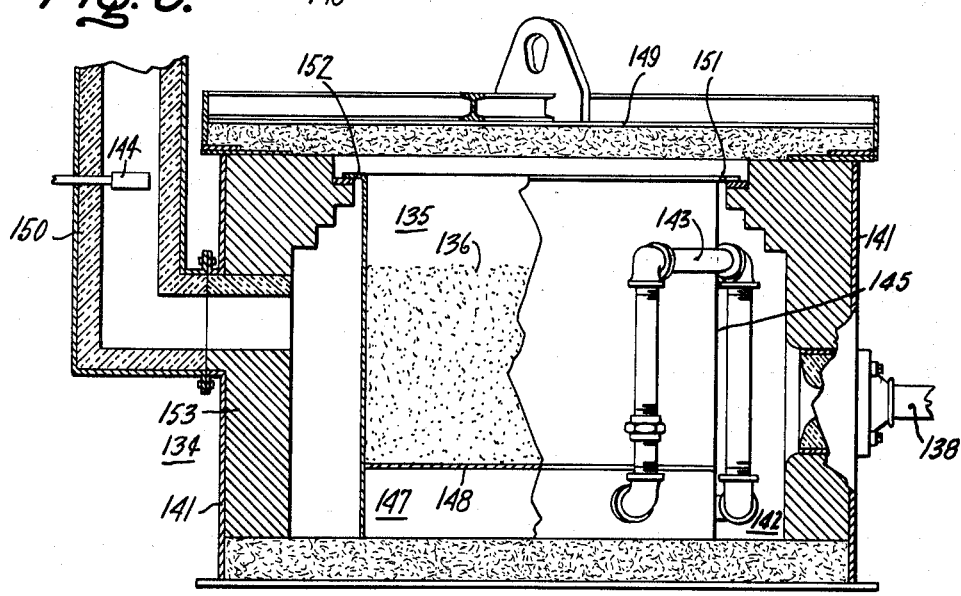
FIGURE 6 is an elevational view, partially in cross section, illustrating still a different heat treating apparatus of the invention.

In FIGURE 6 there is shown still a different preferred heat treating apparatus of the invention which provides means for preheating the fluidizing gas before admission into the fluidizing chamber by passing a stream of the gas contained in an enclosed passageway in contact with gaseous combustion products from burners employed to heat the fluidized chamber. The heat treating apparatus 134 comprises generally a vertical circular fluidizing chamber 135 containing a bed of the granular material 136, heating means 138, 139, and 140 comprising gas burners disposed uniformly around the circumference of the fluidizing chamber in the outer shell 141 of the heat treating apparatus, passage means 142 defined by the annular space between the outer surface of the fluidizing chamber and inner surface of the outer shell, enclosed passageway 143 for transmitting a stream of fluidizing gas into the fluidizing chamber and located in the annular passage 142 so as to be impinged by the gas burner flames and secondary heating means 144 outside of the fluidizing chamber for further heating the fluidizing gas after passage through the bed of granular material. Burners 138, 139, and 140 are supported in the apparatus so that heated products of combustion impinge directly on the fluidizing chamber sidewalls 145 in an overlapping manner thereby resulting in a relatively uniform pattern of heat distribution around the entire circumference of said fluidizing chamber. Conventional circulating means 146 (not shown), such as a fan, pump, blower, etc., in communication with fluidizing gas passageway 143 may be employed for transmission of the gas into plenum chamber 147 of the heat treating apparatus. After introduction into said plenum chamber, the preheated fluidizing gas is admitted to the fluidizing chamber by passage through porous bottom wall member 148 which may have the same type physical structure as already described. There is also included in the apparatus a top-loading cover member 149 to permit insertion and removal of the object being heat treated from the fluidizing chamber. Flue arrangement 150 provides means for exhausting combustion products from the fluidizing chamber to the ambient surroundings after passage through vent openings 151 and 152. Secondary heating means 144 may again consist conveniently of a ring burner having conduit means to a source of fuel and oxygen-containing atmosphere (not shown). While fluidizing chamber 135 has been shown simply as a thin metal shell for simplicity of illustration, it will be realized that construction of the member from refractory materials will produce comparable results. An insulating layer of refractory 153 is shown in the annular passage between the fluidizing chamber and outer shell which communicates with the plenum chamber to illustrate one means for improving the efficiency of heat transfer in the apparatus.

Figure 7:
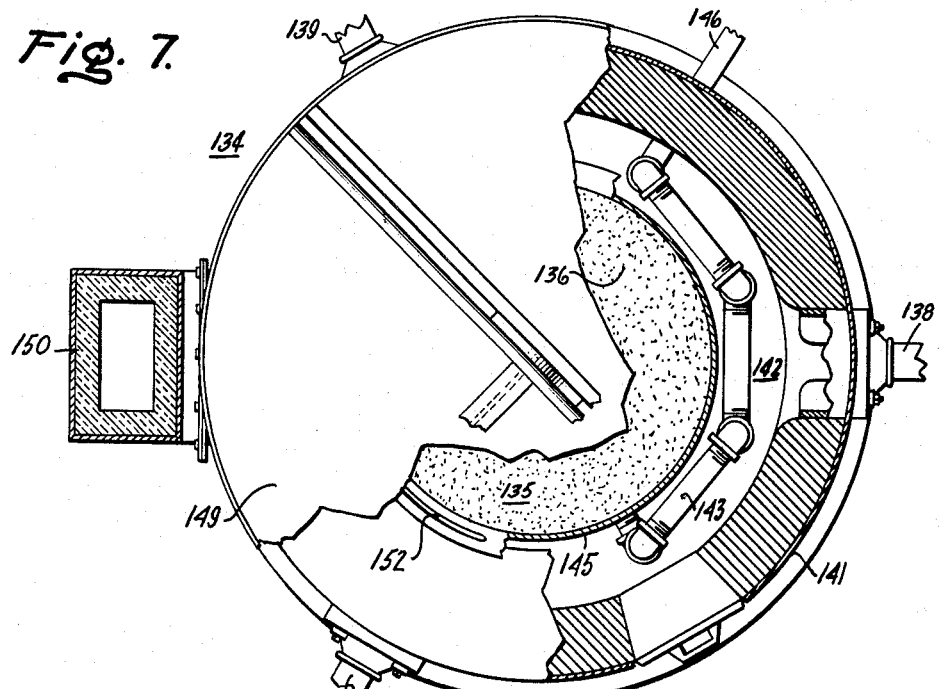
FIGURE 7 is a plan view of the apparatus shown in FIGURE 6.

FIGURE 7 is an elevation view of the heat treating apparatus in FIGURE 6 and is presented to even further amplify the specific structural details of said preferred embodiment. Consequently, the same numerical identification is employed in both figures for corresponding members.

From the foregoing description, it will be apparent that a novel method of removing organic material from a solid body has been provided which leaves undisturbed the more important physical characteristics of the base object. Additionally, various heat treatment apparatus have been shown which are particularly adapted for the novel process of the invention. Compared to the conventional process for stripping organic material from finished electrical parts, the present process reduces the time for the operation from approximately five hours to about twenty minutes. Additionally, it is now possible to strip epoxy insulated electrical parts according to the invention whereas, conventional stripping by heat treatment in an ordinary gas atmosphere furnace leaves residual carbonaceous solid deposits on the trained parts.

It is not intended to limit the present invention to the preferred embodiments above shown since certain modifications of the present teachings can be made without departing from the true spirit and scope of the invention. For example, thermal and electrical insulation can be removed from solid objects according to the invention which are not entirely organic compositions and may not be even predominantly so. In illustration, conventional mica insulation in flake form which has been bonded into a unitary mass with shellac or other organic binders is stripped efficiently from electric motor armatures by the cooperative action of heat and fluidization under the hereinbefore described conditions. The mica flakes after removal tend to float upon the surface of the fluidized bed of granular material so as to be readily separable therefrom without much effort. Likewise, conventional glass wrap insulation comprising organic resin bonded glass fiber is completely removed from electrical parts with facility under comparable operating conditions as described for removal of coatings consisting entirely of an organic material. From these results, it will be obvious that a large variety of coatings containing a major portion of inorganic material in the composition can be removed according to the invention so long as there is substantial organic material therein. In its broadest application, therefore, the present invention comprises a method for removing solid coatings containing an organic material by heating the coated object in a heated fluidized bed to temperatures at least above the decomposition temperature of the organic material in the coating.

It is also not intended to limit the present invention to the specific operating conditions mentioned with respect to the above preferred embodiments. For example, fluid bed operating temperatures of 1200° F. have yielded even further improved results compared with lower operating temperatures around 1000° F. in the removal of magnet wire insulation consisting of a commercial blend of polyvinyl formed with phenol-aldehyde resin and varnished with a commercial acrylic wire enamel. Whereas the time period for removal of a coating in the above examples has been listed at 15–21 minutes, it will be obvious that process time for a particular given coating will depend upon many factors including composition, amount of material being removed, location of the coating, temperature, weight and mass of the coated body, and other considerations. Still further, while preference has been indicated in the above embodiments for removing the coating in a fluidized bed of granular material conductively heated through the fluidizing chamber walls by an external source for simplicity and ease of operation, other heating means are also contemplated. For example, if the body to be treated is one which may be inductively heated such as ferrous metals, ferrous alloys, and the like, suitable heating for practice of the invention may be achieved with an induction heating coil located externally of a ceramic retort employed as the fluidizing chamber.

In view of the described modifications and still others which will be apparent to those skilled in the art, it is intended to limit the present invention, therefore, only to the scope of the following claims.

What I claim as new and desire to secure by Letters Patent of the United States is:

1. An apparatus for decoating a body comprising
   a fluidizing chamber being adapted to contain a bed of granular material in which the body being decoated is placed, which material is capable of suspension in a moving gas stream,
   an outer chamber surrounding said fluidizing chamber so positioned to define a passageway between said outer chamber and said fluidizing chamber,
   circulating means for introducing a stream of fluidizing gas into the passageway and into the fluidizing chamber at sufficient velocity for suspension of the granular material therein, baffles projecting from said outer chamber into the passageway to provide means for slowing the passage of fluidizing gas through the passageway to cause the fluidizing gas to act as an insulating medium for preventing the dissipation of heat from the fluidizing chamber, and heating means positioned within said fluidizing chamber for providing uniform heat distribution throughout the fluidizing chamber for the uniform removal of the coating from the body.

2. An apparatus for decoating electrical equipment comprising a fluidizing chamber having side walls and a bottom wall and being adapted to contain a bed granular material in which the body being decoated is placed, which material is capable of suspension in a moving gas stream, an outer chamber surrounding said fluidizing chamber so positioned to define a passageway between said outer chamber and said fluidizing chamber, circulating means for introducing a stream of fluidizing gas into the passageway and through the bottom of said fluidizing chamber to be sprayed into said fluidizing chamber as sufficient velocity for suspension of the granular material therein, baffles projecting from said outer chamber into the passageway to provide means for slowing the passage of fluidizing gas through the passageway to cause the fluidizing gas to act as both an insulating medium for preventing the dissipation of heat from the fluidizing chamber and for absorbing the heat that is dissipated from the fluidizing chamber and returning that heat to the fluidizing chamber, and electrical heating means positioned within said fluidizing chamber proximate the side walls thereof for providing uniform heat distribution throughout the fluidizing chamber for the uniform removal of the coating from the equipment.

3. An apparatus for decoating a body comprising a fluidizing chamber having side walls and a bottom wall being adapted to contain a bed of granular material in which the body being decoated is placed, which material is capable of suspension in a moving gas stream, an outer chamber surrounding said fluidizing chamber so positioned to define a passageway between said outer chamber and said fluidizing chamber, circulating means for introducing a stream of fluidizing gas into the passageway and through the bottom of said fluidizing chamber to be sprayed into said fluidizing chamber at sufficient velocity for suspension of the granular material therein, baffles projecting from said outer chamber positioned in a staggered pattern in the passageway without coming into contact with the wall of said fluidizing chamber to provide means for slowing the passage of fluidizing gas through the passageway to cause the fluidizing gas to act as both an insulating medium for preventing the dissipation of heat from the fluidizing chamber and for absorbing the heat that is dissipated from the fluidizing chamber and returning that heat to the fluidizing chamber, and heating means positioned within said fluidizing chamber proximate the side walls thereof for providing uniform heat distribution throughout the fluidizing chamber for the uniform removal of the coating from the body.

4. An apparatus for decoating a body comprising a fluidizing chamber having side walls and a bottom wall being adapted to contain a bed of granular material in which the body being decoated is placed, which material is capable of suspension in a moving gas stream, an outer chamber surrounding said fluidizing chamber so positioned to define a passageway between said outer chamber and said fluidizing chamber, circulating means for introducing a stream of fluidizing gas into the passageway and through the bottom of said fluidizing chamber to be sprayed into said fluidizing chamber at sufficient velocity for suspension of the granular material therein, baffles projecting from said outer chamber positioned in a staggered pattern in the passageway without coming into contact with the wall of said fluidizing chamber to provide means for slowing the passage of fluidizing gas to act as both an insulating medium for preventing the dissipation of heat from the fluidizing chamber and for absorbing the heat that is dissipated from the fluidizing chamber and returning that heat to the fluidizing chamber, and U-shaped electrical heating means positioned within said fluidizing chamber proximate the side walls thereof for providing uniform heat distribution throughout the fluidizing chamber for the uniform removal of the coating from the body.

References Cited by the Examiner

UNITED STATES PATENTS

| | | | |
|---|---|---|---|
| 2,212,120 | 7/1940 | Kneale et al. | |
| 2,670,425 | 2/1954 | Stone | 219—378 |
| 2,750,681 | 6/1956 | Berry | 34—57 |
| 3,053,704 | 9/1962 | Munday | 263—40 |

FOREIGN PATENTS 732,101  6/1955  Great Britain.

WILLIAM F. O'DEA, *Primary Examiner.*

JOHN J. CAMBY, *Examiner.*

D. A. TAMBURRO, *Assistant Examiner.*